United States Patent [19]
Olsson

[11] Patent Number: 6,098,792
[45] Date of Patent: Aug. 8, 2000

[54] CONVEYOR BELT

[75] Inventor: Lennart Olsson, Nyhamnsläge, Sweden

[73] Assignee: Frigoscandia Equipment AB, Helsingborg, Sweden

[21] Appl. No.: 09/313,641

[22] Filed: May 18, 1999

Related U.S. Application Data

[63] Continuation of application No. PCT/SE97/01920, Nov. 17, 1997.

[30] Foreign Application Priority Data

Nov. 18, 1996 [SE] Sweden .................................. 9604206

[51] Int. Cl.[7] ................................................... B65G 17/06
[52] U.S. Cl. ........................................... 198/850; 198/778
[58] Field of Search ..................... 198/778, 848, 198/849, 850, 853

[56] References Cited

U.S. PATENT DOCUMENTS

| | | | |
|---|---|---|---|
| 3,938,651 | 2/1976 | Alfred et al. ............................ | 198/778 |
| 4,776,454 | 10/1988 | Momose .............................. | 198/850 X |
| 4,858,750 | 8/1989 | Lawley .................................... | 198/778 |

FOREIGN PATENT DOCUMENTS

| | | |
|---|---|---|
| 0 038 461 | 10/1981 | European Pat. Off. . |
| 504 655 | 1/1997 | Sweden . |
| 504 656 | 1/1997 | Sweden . |
| 505 881 | 10/1997 | Sweden . |
| WO 90/08080 | 7/1990 | WIPO . |

*Primary Examiner*—James R. Bidwell
*Attorney, Agent, or Firm*—Browdy and Neimark

[57] ABSTRACT

A conveyor belt comprises a plurality of interconnected elements (1, 2), which are successively arranged in the longitudinal direction of the conveyor belt. The elements are movable relative to each other at least about axes (3) which extend transversely of the longitudinal direction of the conveyor belt and in parallel with the plane of the conveyor belt. The elements (1, 2) are alternatively of a first type and a second type. Each element (1) of the first type has the form of an inversely U-shaped beam extended transversely of the longitudinal direction of the conveyor belt. This beam has flanges (6) and a web (7) interconnecting the flanges as well as a plurality of openings (8), spaced apart along the beam, in each border area between the web (7) and the respective flanges (6). Each element (2) of the second type has lugs (5), which are locked against complete withdrawal from the neighboring openings (8) in each of the two adjoining elements (1) of the first type.

12 Claims, 3 Drawing Sheets

CONVEYOR BELT

CROSS REFERENCE TO RELATED APPLICATION

The present application is a continuation of copending parent application No. PCT/SE97/01920, filed Nov. 17, 1997.

The present invention relates to a conveyor belt comprising a plurality of interconnected elements, which are arranged successively in the longitudinal direction of the conveyor belt and which are movable relative to each other at least about axes extending transversely of the longitudinal direction of the conveyor belt and in parallel with the plane of the conveyor belt.

Conveyor belts of this kind may be, for instance, of the chain type or of the type having a plurality of transverse rods which support a wire netting. In many cases, prior-art conveyor belts, however, do not have the properties that are desirable in respect of manufacture, operation and maintenance.

Thus it is desirable for the conveyor belt to have such a relatively simple construction as to allow essentially automatic manufacture starting from a small number of components. It is also desirable for the conveyor belt to have such rigidity in the transverse direction that, although supported merely along its lateral edges, it is capable of carrying considerable loads.

For many sensitive products, it is also essential that the conveyor belt has an even supporting surface while at the same time this supporting surface may have to be foraminous, for instance to enable air to pass transversely of the plane of the conveyor belt. For conveyor belts in the food industry it is also essential that all surfaces of the conveyor belt are relatively easy to reach, thereby making it possible to clean the conveyor belt in an easy and reliable manner during operation.

Although many conveyor belts travel merely in rectilinear paths and round deflecting rollers, it is in many contexts desirable for a conveyor belt to be movable in all directions, i.e. also to be able to follow curves in its own plane, such that a helical path becomes possible for the conveyor belt.

The object of the present invention therefore is to provide a conveyor belt which has at least the major part of the properties described above.

According to the invention, this object is achieved by the conveyor belt of the type stated by way of introduction being given the features that appear from appended claim 1. Thus, the elements should alternatingly be of a first type and a second type, each element of the first type should have the form of an inversely U-shaped beam extended transversely of the longitudinal direction of the conveyor belt, said beam having flanges and a web interconnecting the flanges as well as a plurality of openings, spaced apart along the beam, in each border area between the web and the respective flanges, and each element of the second type should have lugs which are insertable into the neighbouring openings in each of the two adjoining elements of the first type, and which are locked against complete withdrawal from the openings.

The inventive construction of the conveyor belt thus means that the conveyor belt, apart from any lateral edge components, consists of merely two types of elements of such a design that a highly automated manufacture becomes possible. Besides, the belt will have a very even supporting surface while at the same time the rigidity in the transverse direction can be made great in consequence of every second beam being a U beam. By suitable dimensioning of the openings and the lugs, the inventive conveyor belt can also travel along curves in the plane of the belt, the elements being telescoped more and more in the direction of the inner lateral edge of the conveyor belt through the curve.

To obtain as great rigidity as possible in the transverse direction of the belt, the flanges of the inversely U-shaped beam are essentially unbroken except for the openings. The rigidity of the beam can be further improved by its flanges being bent in the V shape along a line parallel with the longitudinal direction of the beam.

To enable quick and easy assembly of the elements of the first and the second type, each lug can be locked against withdrawal by means of a downwardly folded tongue which is part of the associated first element. Preferably, each downwardly folded tongue is formed of a part of the web of the associated first element, which may have openings in the web, into which openings the tongues project before folding down and which openings can be essentially larger than the tongues to permit larger quantities of air to pass transversely of the plane of the conveyor belt.

Advantageously, the elements of the second type are made of zigzag metal wire, which then preferably have lugs in the form of 180° bends interconnected by parallel legs.

The elements of the first type can be made of metal, e.g. spring metal sheet, but can also be made of plastic.

An embodiment of the present invention will now be described in more detail with reference to the accompanying drawings.

Figure 1:
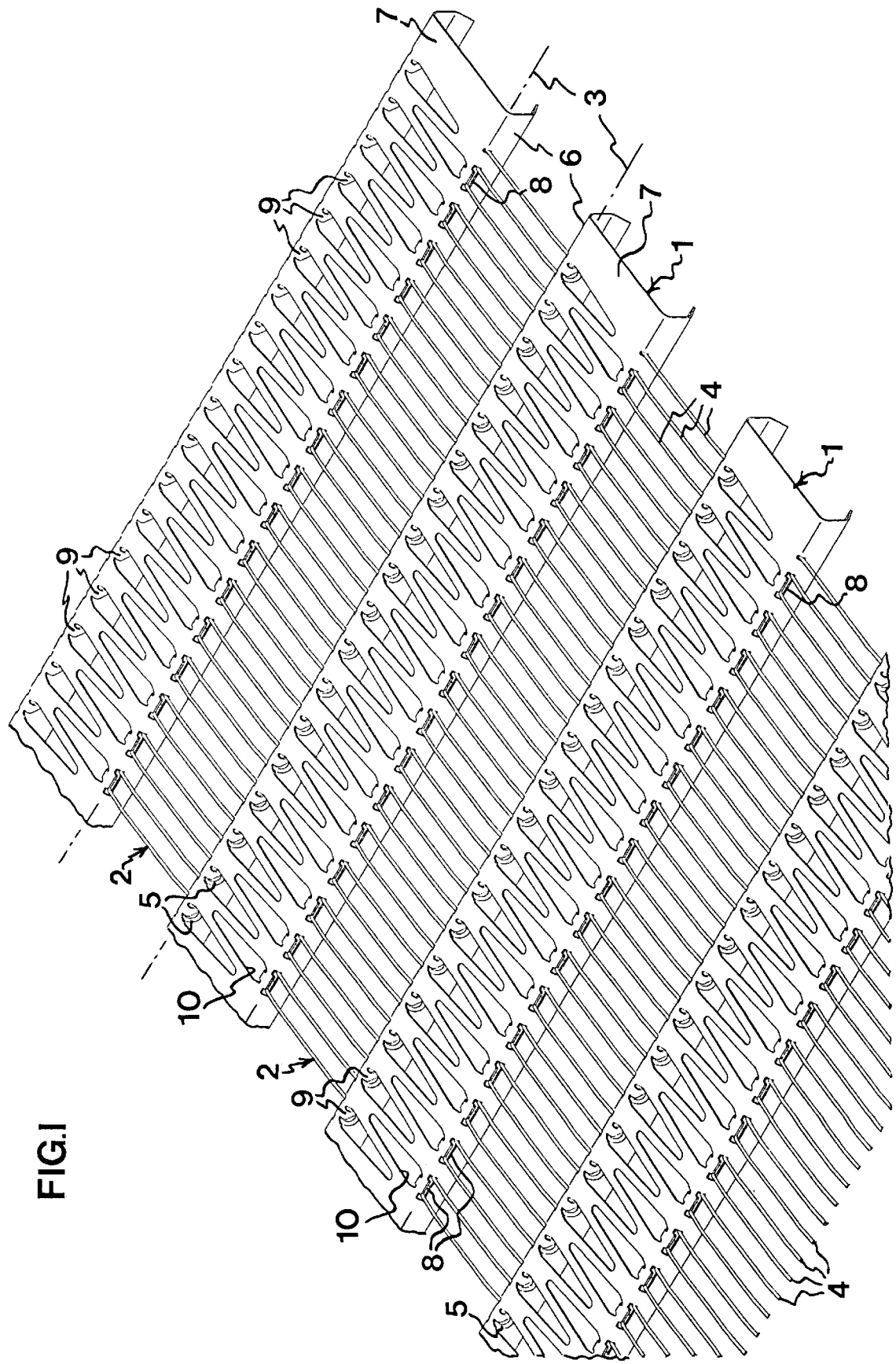
FIG. 1 is a perspective view of a part of a conveyor belt according to an embodiment of the present invention.
Figure 2:
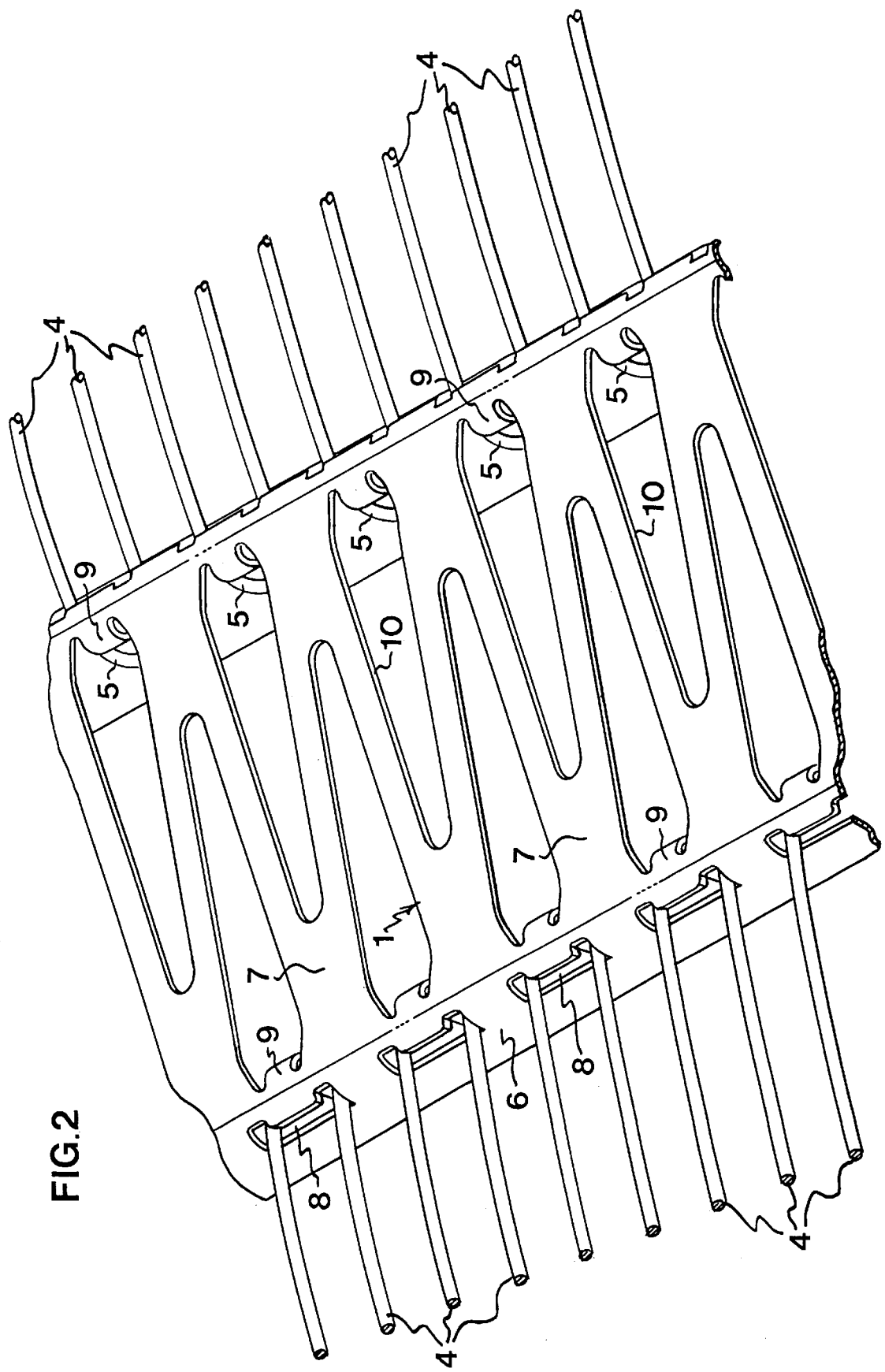
FIG. 2 shows a part of the conveyor belt in FIG. 1 on a larger scale.
Figure 3:
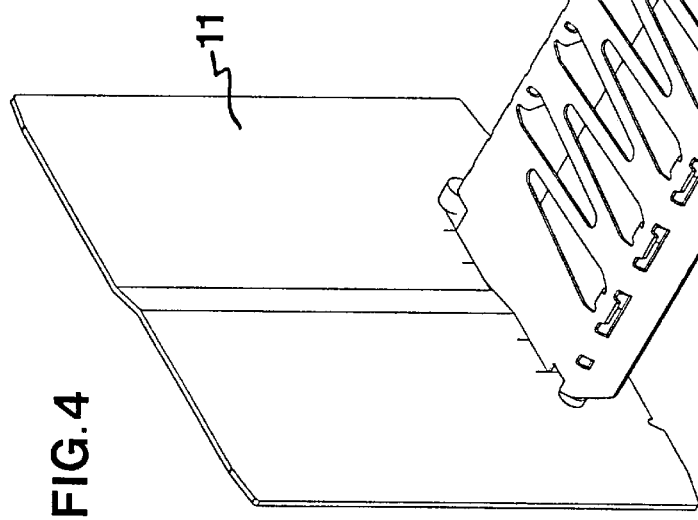
FIG. 3 is a cross-sectional view and illustrates in more detail the interconnection of the elements included in the conveyor belt.

The embodiment of a conveyor belt according to the present invention as shown in FIGS. 1–3 comprises elements 1 of a first type, which alternate in the longitudinal direction of the conveyor belt with elements 2 of a second type. The elements 1, 2 are interconnected and are also movable relative to each other about axes 3, which extend transversely of the longitudinal direction of the conveyor belt and in parallel with the plane of the conveyor belt.

Each element 2 of the second type is a zigzag element with legs 4, which are parallel with each other and with the longitudinal direction of the conveyor belt and which are interconnected by means of lugs 5 in the form of 180° bends. Each element 2 is made in one piece of metal wire, preferably of stainless steel. As shown in FIG. 2, the lugs 5 are bent slightly downwards and the portions of the legs 4 closest to the lugs 5 are bent slightly less downwards relative to the plane which the major part of the legs 5 forms.

The elements 1 of the first type each have the form of an inversely U-shaped beam with flanges 6 and a web 7 interconnecting the flanges. In each flange 6 immediately adjacent to the web 7 there are openings 8 for receiving a respective one of the lugs 5 on one side of one of the elements 2. The openings 8 have a width and a height which allow insertion of a lug 5 and neighbouring portions of the connecting legs 4. On each element 1 are also the openings 8 of one flange 6 between the openings 8 of the other flange 6. Immediately adjacent to each opening 8, the elements 1 have a tongue 9 which is punched in the web 7 and which is bent downwards to lock a lug 5 in the opening 8 after insertion of the lug 5 and neighbouring portions of the connecting legs 4 into the opening 8 a distance longer than the length of the tongue 9.

In the illustrated embodiment, the tongues 9 are essentially smaller than openings 10 in the web 7 of the elements 1, said openings 10 each encompassing a tongue 9. The reason for this is that the elements 1 should be able to achieve such a degree of open area as is desirable for a sufficient amount of air to be blown therethrough, for instance, for freezing food products which are at least partly supported by the elements 1 of the conveyor belt.

The elements 1 and 2 are movable relative to each other in the longitudinal direction of the conveyor belt by the lugs 5 being movable inwards through the associated openings 8. A maximum insertion distance is obtained by each lug 5 being insertable a distance which is equal to the extent of the elements 1 in the longitudinal direction of the conveyor belt, or half this distance if the lugs 5 of two elements 2 adjoining an element 1 are arranged opposite each other, so as to abut against each other when inserted through the respective openings 8.

The lugs 5 may have different lengths seen in the longitudinal direction of the conveyor belt, along the element 2, for instance such that when the conveyor belt travels along a curve essentially in its own plane, e.g. a helical path, the elements 1 and 2 on the inside of the curve can be moved closer together whereas the elements 1 and 2 on the outside of the curve can be moved further away from each other.

Figure 4:
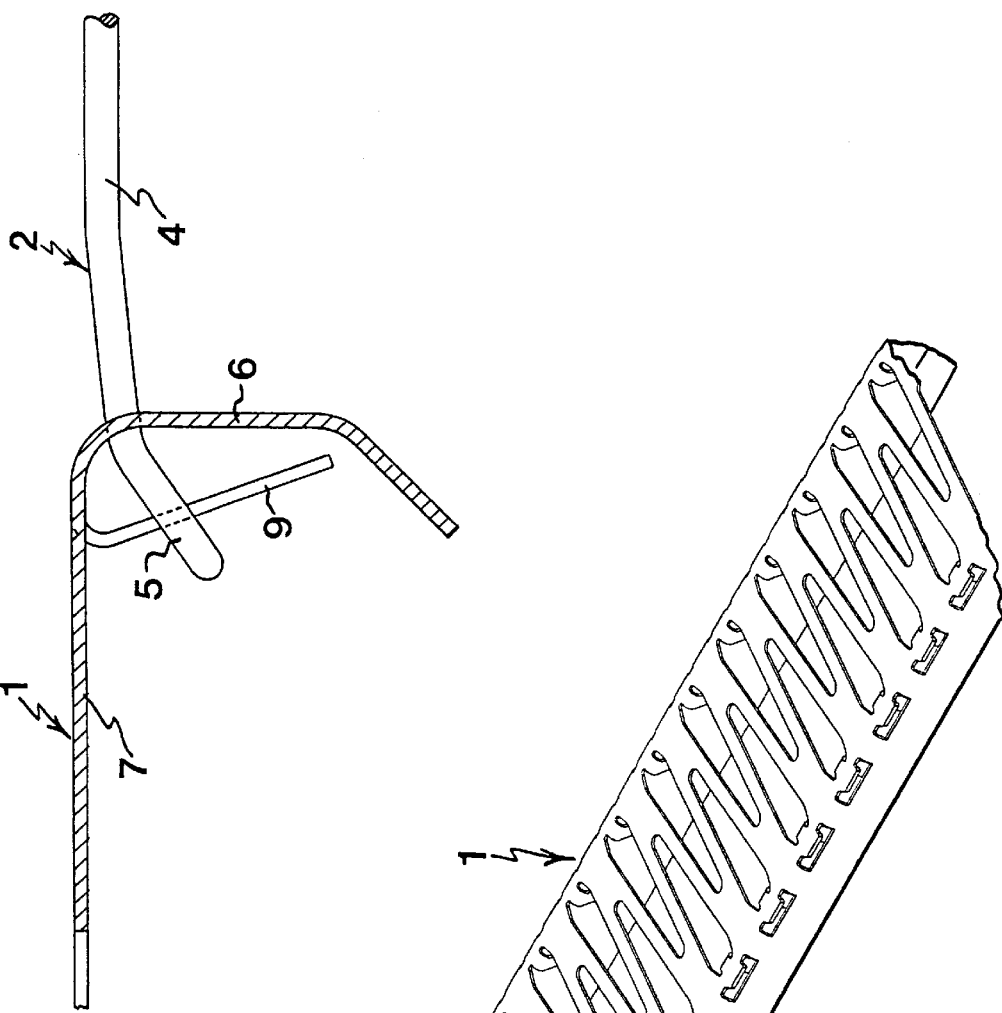
FIG. 4 is a perspective view corresponding to FIG. 1 and shows the same conveyor belt equipped with lateral plates.

As shown in the embodiment in FIG. 4, the elements 1 are provided with vertical lateral plates 11, which may serve to hold the products on the conveyor belt, to guide an air flow directed through the conveyor belt and to support a superjacent turn of the belt at least on one side of the conveyor belt when the conveyor belt travels along a helical path.

Obviously several modifications and variants of the conveyor belts described above are possible within the scope of the invention as defined by the appended claims. Thus, the elements can be designed in other ways, e.g. be entirely or partly made of punched metal sheets as long as they have the lugs 5. The positioning of the openings 8 in the elements 1 may also be varied, for instance, the openings 8 in one flange 6 of an element 1 can be located opposite the openings 8 in the other flange 6 of the same element 1.

What is claimed is:

1. A conveyor belt comprising a plurality of interconnected elements (1, 2), which are arranged successively in the longitudinal direction of the conveyor belt and which are movable relative to each other at least about axes (3) extending transversely of the longitudinal direction of the conveyor belt and in parallel with the plane of the conveyor belt, characterised in that the elements (1, 2) are alternatingly of a first type and a second type, that each element (1) of the first type has the form of an inversely U-shaped beam extended transversely of the longitudinal direction of the conveyor belt, said beam having flanges (6) and a web (7) interconnecting the flanges as well as a plurality of openings (8), spaced apart along the beam, in each border area between the web (7) and the respective flanges (6), and that each element (2) of the second type has lugs (5) which are insertable into the neighbouring openings (8) in each of the two adjoining elements (1) of the first type and which are locked against complete withdrawal from the openings (8).

2. A conveyor belt as claimed in claim 1, characterised in that the flanges (6) of the inversely U-shaped beam are essentially unbroken.

3. A conveyor belt as claimed in claim 1, characterised in that each of the flanges (6) of the inversely U-shaped beam are bent in V shape along a line parallel with the longitudinal direction of the beam.

4. A conveyor belt as claimed in claim 1, characterised in that each element (1) of the first type, at each lateral edge of the conveyor belt, has a vertical lateral plate (11).

5. A conveyor belt as claimed in claim 1, characterised in that the elements (1) of the first type are made of metal sheet or plastic.

6. A conveyor belt as claimed in claim 5, characterised in that the elements (1) of the first type are made of spring metal sheet.

7. A conveyor belt as claimed in claim 1, characterised in that the openings (8) spaced apart along each beam are formed in the flanges (6).

8. A conveyor belt as claimed in claim 1, characterised in that each element (2) of the second type is made of zigzag metal wire.

9. A conveyor belt as claimed in claim 1, characterised in that each lug (5) is locked against withdrawal by means of a downwardly folded tongue (9), which constitutes part of the associated first element (1).

10. A conveyor belt as claimed in claim 9, characterised in that each of the downwardly folded tongues (9) is formed of a part of the web of the associated first element (1).

11. A conveyor belt as claimed in claim 10, characterised in that each of the elements (1) of the first type has openings (10) formed in the web (7), into which openings (10) the tongues (9) project before being folded down.

12. A conveyor belt as claimed in claim 1, characterised in that the free ends of the tongues (9) abut against the inside of one of the flanges (6) of the U beam.

* * * * *